Patented June 6, 1950

2,510,164

UNITED STATES PATENT OFFICE 2,510,164

WATER-INSOLUBLE DERIVATIVES OF NICOTINIC ACID AND PROCESS FOR PREPARING THEM

Charles F. Woodward, Abington, and Charles O. Badgett, Glenside, Pa., assignors to the United States of America as represented by the Secretary of Agriculture No Drawing. Application April 24, 1945, Serial No. 590,104

4 Claims. (Cl. 99—11)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

The present invention relates to new compositions of matter having therapeutic value and is more particularly concerned with derivatives of nicotinic acid. This invention also relates to methods of preparing these new compositions.

Nicotinic acid, commonly termed niacin, is an essential factor in the human diet and is specifically effective in the prevention of pellagra. The amide derivative of nicotinic acid, nicotinamide, exhibits the same biological specificity and is somewhat preferable to nicotinic acid for human consumption since it is less likely to cause a physiological reaction known as "flushing." In order to insure adequate quantities of this vitamin in the national dietary, measures have been taken to enrich certain foodstuffs which are commonly included in the average diet.

The fortification of wheat flour with nicotinic acid or nicotinamide is now an established practice. Since little or no loss of the vitamin occurs in the baking process, the production of bread enriched with nicotinic acid or nicotinamide has not been especially problematical. However, the water-solubility of nicotinic acid and nicotinamide is disadvantageous in the fortification of other food materials, such as corn grits, white rice, and, in general, those food materials which require rinsing prior to cooking, because much of the vitamin is lost in the washing process.

We have found that the new compositions of this invention not only retain wholly or in part the pellagra-preventing properties of nicotinic acid, but they are also effective as anti-convulsants and anti-spasmodics. These new compositions of matter are also substantially insoluble in water. However, they are moderately soluble in organic solvents, and, therefore, may be used for the preparation of solutions suitable for impregnating or depositing the composition on food products. These compositions are also sufficiently stable to the action of water so that they undergo little or no hydrolysis during washing processes.

The new compositions of this invention are alkyl esters of nicotinic acid in which the alkyl group contains from six to eighteen carbon atoms, inclusive. The alkyl group may be a continuous straight carbon chain or it may be a branched chain type without seriously detracting from the desirable properties of these novel therapeutic compositions. These compositions may be represented by the following general formula:

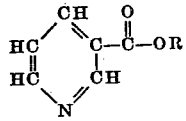

in which R represents a monovalent aliphatic radical containing from 5 to 18 carbon atoms, inclusive.

These alkyl esters may be prepared by reacting a corresponding aliphatic alcohol with nicotinyl chloride or with nicotinyl chloride hydrochloride. This reaction is conveniently conducted in the presence of a solvent or reaction diluent, such as pyridine, and the aliphatic nicotinic ester is recovered from the reaction mixture after sufficient alkalinization of the hydrochloride salt.

The following example will illustrate the nature of our invention and the manner in which it may be practiced:

Thirty-five and seven-tenths grams of thionyl chloride was added with stirring and cooling to a mixture of 36.9 grams of nicotinic acid and 47.4 grams of pyridine maintained in a 500 cc. 3-necked flask equipped with a dropping funnel, a reflux condenser, and a mercury-sealed stirrer. The time of thionyl chloride addition was 20 minutes. The reaction mixture was then heated for one hour at 100° C. Forty-two and nine-tenths grams of octanol-1 was added over a period of five minutes, and the resulting mixture was then heated at 95–100° C. for 3 hours.

The reaction mixture was then poured into 500 cc. water and a dilute sodium hydroxide solution was added in sufficient quantity to make the mixture very slightly alkaline. The water-insoluble fraction was then separated and washed in turn with dilute sodium carbonate solution and water. The original water solution, from which the water-insoluble ester had been separated, was then extracted twice with 100 cc. portions of diethyl ether. The combined ether extracts were then added to the washed ester fraction and the solution dried over anhydrous sodium sulfate. The drying agent was filtered off, and the distillate then fractionally distilled under reduced pressure. The 46.2 gram portion distilling at 116° C./0.18 mm. was pure n-octyl nicotinate. Percent C. calculated=71.49, percent carbon found=71.43. $N_D^{25}=1.4856$. Density $_4^{25}=0.9871$.

By a procedure similar to the above, the following n-alkyl esters of nicotinic acid have been prepared:

| n-alkyl Nicotinate | Density$_4^{25}$ | $N_D^{25}$ | Boiling Point, °C. |
|---|---|---|---|
| amyl | 1.0217 | 1.4847 | 84° at 0.15 mm. |
| hexyl | 1.0133 | 1.4897 | 103–104° at 0.2 mm. |
| heptyl | 0.9939 | 1.4846 | 108–110° at 0.2 mm. |
| octyl | 0.9871 | 1.4856 | 116–117.5° at 0.2 mm. |
| nonyl | 0.9852 | 1.4853 | 130–132° at 0.2 mm. |
| decyl | 0.9714 | 1.4847 | 140–141° at 0.25 mm. |
| undecyl | 0.9606 | 1.4829 | 159–160° at 0.5 mm. |

In addition to the above-named compounds, we have also prepared by similar procedures dodecyl, tetradecyl, hexadecyl, and octadecyl esters of nicotinic acid.

Having thus described our invention, we claim:

1. In a method of fortifying a food with antipellagra factor, said food being one which is processed with water subsequent to fortification, the improvement comprising adding to the food a compound of the general formula

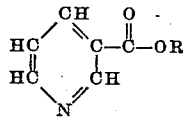

in which R represents a monovalent, acyclic aliphatic radical containing from 6 to 18 carbon atoms, inclusive.

2. A food composition containing as an antipellagra factor a compound of the general formula

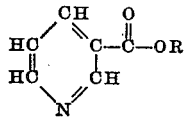

in which R represents a monovalent, acyclic aliphatic radical containing from 6 to 18 carbon atoms, inclusive, said food being one which is subjected to water-processing before use and subsequent to fortification with said factor.

3. A food fortified with octyl nicotinate as antipellagra factor, the food being one which is water-processed subsequent to fortification, prior to consumption.

4. A food fortified with n-lauryl nicotinate as anti-pellagra factor, the food being one which is water-processed subsequent to fortification prior to consumption.

CHARLES F. WOODWARD.
CHARLES O. BADGETT.

REFERENCES CITED

The following references are of record in the file of this patent:

UNITED STATES PATENTS

| Number | Name | Date |
|---|---|---|
| 1,611,978 | Wolffenstein | Dec. 28, 1926 |
| 2,375,301 | Joyce | May 8, 1945 |

OTHER REFERENCES

Berichte 27, p. 1787.

Meyer Trav. Chunique de Pay Bas (1925), p. 326.

Chem. Abstracts, vol. 31, page 6657.

"Chemistry and Physiology of the Vitamins," by H. R. Rosenberg, Interscience Publishers, Inc., New York (1942), page 239.

Bean & Spies, A Study of the Effects of Nicotinic Acid and Related Pyridine and Pyrazine Compounds on the Temperature of the Skin of Human Beings, published in the American Heart Journal, vol. 20, 1940, pages 62–75.